United States Patent
Bai et al.

(10) Patent No.: US 11,485,896 B2
(45) Date of Patent: Nov. 1, 2022

(54) OIL-BASED DRILLING FLUID COMPOSITION, OIL-BASED DRILLING FLUID AND PREPARATION METHOD AND USE THEREOF

(71) Applicant: Southwest Petroleum University, Chengdu (CN)

(72) Inventors: Yang Bai, Chengdu (CN); Daoxiong Li, Chengdu (CN); Pingya Luo, Chengdu (CN); Wen Xu, Chengdu (CN); Wenzhe Li, Chengdu (CN); Lingfeng Wu, Chengdu (CN); Haibo Liang, Chengdu (CN); Dezhi Liu, Chengdu (CN); Jing Zhang, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/511,275

(22) Filed: Oct. 26, 2021

(65) Prior Publication Data
US 2022/0290032 A1  Sep. 15, 2022

(30) Foreign Application Priority Data

Mar. 12, 2021 (CN) .......................... 202110269570.0

(51) Int. Cl.
 C09K 8/36 (2006.01)
 C09K 8/504 (2006.01)
 C01F 11/18 (2006.01)

(52) U.S. Cl.
 CPC .......... *C09K 8/5045* (2013.01); *C01F 11/185* (2013.01); *C09K 8/36* (2013.01); *C01P 2004/64* (2013.01); *C09K 2208/10* (2013.01)

(58) Field of Classification Search
 CPC .... C09K 8/5045; C09K 8/36; C09K 2208/10; C01F 11/185; C01P 2004/64
 See application file for complete search history.

(56) References Cited

U.S. PATENT DOCUMENTS

| | | | | |
|---|---|---|---|---|
| 4,233,162 A | * | 11/1980 | Carney | C09K 8/035 507/131 |
| 10,336,932 B1 | * | 7/2019 | Bai | C09K 8/426 |
| 2007/0249502 A1 | * | 10/2007 | Procter | C10M 175/0016 504/351 |
| 2010/0230169 A1 | | 9/2010 | Pomerleau | |
| 2012/0157353 A1 | | 6/2012 | Breeden et al. | |

FOREIGN PATENT DOCUMENTS

| | | | | |
|---|---|---|---|---|
| CA | 2696388 A1 | | 9/2010 | |
| CN | 103045210 A | | 4/2013 | |
| CN | 104610935 A | | 11/2013 | |
| CN | 103602323 A | * | 2/2014 | ............ C09K 8/035 |
| CN | 102807850 A | | 7/2014 | |
| CN | 102134477 | | 9/2014 | |
| CN | 104232037 A | | 12/2014 | |
| CN | 104610945 A | * | 5/2015 | ............... C09K 8/36 |
| CN | 106046421 A | | 10/2016 | |
| CN | 109233764 A | | 1/2019 | |
| CN | 109575643 A | | 4/2019 | |
| CN | 110295030 A | | 10/2019 | |
| CN | 108048052 B | * | 12/2019 | ............... C09K 8/22 |

OTHER PUBLICATIONS

Zhang et al., "Colloids and Surfaces A: Physiochemical and Engineering", Aspects 477, 2015, pp. 55-62.
Chonghao et al., "Research Progress on Surface—Modification of Nanoparticles," New Chemical Materials, vol. 30, No. 7, Jul. 2002, 5 pages, English Abstract.

* cited by examiner

Primary Examiner — Kumar R Bhushan
(74) Attorney, Agent, or Firm — Calfee Halter & Griswold LLP

(57) ABSTRACT

An oil-based drilling fluid composition, includes a base fluid and a treating agent. The base fluid comprises a base oil and an inhibitor; the treating agent comprises an organic soil, a main emulsifier, an auxiliary emulsifier, a plugging agent, a weighting agent, a humectant, an alkaline regulator and a filtrate reducer. 5-25 parts by weight of the inhibitor, 5-12 parts by weight of the organic soil, 1-6 parts by weight of the main emulsifier, 2-8 parts by weight of the auxiliary emulsifier, 3-18 parts by weight of the plugging agent, 5-30 parts by weight of the weighting agent, 2-6 parts by weight of the humectant, 2-7 parts by weight of the alkaline regulator and 2-10 parts by weight of the filtrate reducer are used, based on 100 parts by weight of base oil.

15 Claims, No Drawings

OIL-BASED DRILLING FLUID COMPOSITION, OIL-BASED DRILLING FLUID AND PREPARATION METHOD AND USE THEREOF

PRIORITY CLAIM & CROSS REFERENCE

The application claims priority to Chinese Application No. 202110269570.0, filed on Mar. 12, 2021, which is herein specifically and entirely incorporated by reference.

FIELD

The present disclosure relates to the technical field of drilling fluid, in particular to an oil-based drilling fluid composition, an oil-based drilling fluid and a preparation method and a use thereof.

BACKGROUND

The borehole wall instability is an important engineering problem which puzzles the practitioners of industrial field of drilling fluid and needs to be solved urgently but has not been successfully solved well for many years. The borehole wall instability will cause complex conditions such as borehole collapse, sticking of the drilling tool, and well leakage, such that the drilling quality and progress are seriously affected. The borehole wall instability of the stratum mainly occurs in a hard and brittle shale stratum containing fractures, a majority of the stratum has the closed or opened stratification and micro-cracks, which have strong capillary action force. Under the action of positive pressure difference and capillary pressure, the drilling fluid is prone to invade, so that the shale cracks along a fracture surface or a stratification surface, and continuously develops longitudinally and transversely along the fracture surface, such that the phenomenon of borehole wall instability is increased. For the sake of solving the borehole wall instability of the stratum, the only solution is to add a plugging material into the drilling fluid, which fills cracks and forms a barrier layer on the borehole wall, so that the pressure transmission process caused by an invasion of a borehole fluid into the stratum can be effectively prevented, the purpose of stabilizing the borehole wall is fulfilled. Compared with the water-based drilling fluid, the oil-based drilling fluid has the advantages of high temperature resistance, salt corrosion resistance, being favorable to the borehole wall stability, and small damage to an oil-gas reservoir layers.

The conventional drilling fluid treating agent has a particle size within a range of 0.1-100 μm, the treating agent is mainly applicable for plugging stratum pore throats and fractures with a size of 0.1-1 mm. The rock type with the smallest pore size in the stratum rock has the pore size distribution of 1-10 nm, which indicates that the conventional treating agent in the drilling fluid is difficult to form a mud cake in the low-permeability stratum. Therefore, in regard to the last stage of plugging material for stabilizing the well wall of the micro-crack stratum, the particle size of the plugging material must be in the nanometer level so as to prevent the drilling fluid from entering the stratum, and achieve the effect of stabilizing the borehole wall.

However, although the particle size of the existing nanometer plugging material reaches the nanometer level, the nanometer material has the characteristics of small particle size, large specific surface energy and being prone to agglomerate, the nanometer material cannot be dispersed in a liquid phase at the nanometer level, thus it can hardly plug the micro-nano pores. The nanometer material used for plugging the pores has poor pressure bearing capacity, it can hardly prevent propagation of pressure, thus it is difficult to produce the desirable plugging effect.

Therefore, a nanometer plugging material with lipophilicity and strong bearing capacity is urgently needed to meet the oil and gas exploitation work of rock stratum, such as rock type marl interlayers with nano-scale pore diameters in the stratum rocks.

SUMMARY

The present disclosure aims to overcome the problems in the prior art that the nanometer plugging material has a small particle size, a large specific surface energy and is prone to agglomerate, and provides an oil-based drilling fluid composition, an oil-based drilling fluid, a preparation method and a use thereof. The oil-based drilling fluid composition comprises modified nanometer calcium carbonate with lipophilicity and strong pressure-bearing capacity, which can enter the nano-scale micropores for plugging the micro-cracks, and has desired pressure-bearing capacity.

In order to achieve the above object, a first aspect of the present disclosure provides an oil-based drilling fluid composition comprising a base fluid and a treating agent, wherein the base fluid comprises a base oil and an inhibitor; the treating agent comprises an organic soil, a main emulsifier, an auxiliary emulsifier, a plugging agent, a weighting agent, a humectant, an alkaline regulator and a filtrate reducer;

wherein 5-25 parts by weight of the inhibitor, 5-12 parts by weight of the organic soil, 1-6 parts by weight of the main emulsifier, 2-8 parts by weight of the auxiliary emulsifier, 3-18 parts by weight of the plugging agent, 5-30 parts by weight of the weighting agent, 2-6 parts by weight of the humectant, 2-7 parts by weight of the alkaline regulator and 2-10 parts by weight of the filtrate reducer are used, based on 100 parts by weight of base oil.

A second aspect of the present disclosure provides an oil-based drilling fluid prepared by mixing the aforementioned oil-based drilling fluid composition.

A third aspect the present disclosure provides a method of preparing an oil-based drilling fluid, the method comprises the following steps:

mixing the base fluid with a main emulsifier, an auxiliary emulsifier, a filtrate reducer, a humectant, an alkaline regulator, organic soil, a plugging agent and a weighting agent in sequence to prepare the oil-based drilling fluid;

wherein the base fluid comprises a base oil and an inhibitor;

5-25 parts by weight of the inhibitor, 5-12 parts by weight of the organic soil, 1-6 parts by weight of the main emulsifier, 2-8 parts by weight of the auxiliary emulsifier, 3-18 parts by weight of the plugging agent, 5-30 parts by weight of the weighting agent, 2-6 parts by weight of the humectant, 2-7 parts by weight of the alkaline regulator and 2-10 parts by weight of the filtrate reducer are used, based on 100 parts by weight of base oil.

A fourth aspect of the present disclosure provides an oil-based drilling fluid prepared with the aforementioned method.

A fifth aspect of the present disclosure provides a use of the aforementioned oil-based drilling fluid composition or the aforementioned oil-based drilling fluid for leakage prevention and plugging in the well drilling operation.

Through the above technical scheme, the present disclosure has the following advantages:

(1) the modified nanometer calcium carbonate contained in the oil-based drilling fluid composition can be desirably dispersed into the drilling fluid, and can plug the micro-cracks with a low concentration, so that an invasion of the drilling fluid can be prevented, the permeability of a shale stratum can be reduced, the propagation of pore pressure is delayed, and the bearing capacity of the stratum is enhanced;

(2) the oil-based drilling fluid prepared with the oil-based drilling fluid composition of the present disclosure has excellent rheological property, and can improve purification capability of the borehole; the drilling fluid has high plugging rate and strong adaptability, can significantly improve stability of the borehole, facilitate the high-quality, rapid, safe and efficient drilling operation.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides an oil-based drilling fluid composition comprising a base fluid and a treating agent, wherein the base fluid comprises a base oil and an inhibitor; the treating agent comprises an organic soil, a main emulsifier, an auxiliary emulsifier, a plugging agent, a weighting agent, a humectant, an alkaline regulator and a filtrate reducer;

wherein 5-25 parts by weight of the inhibitor, 5-12 parts by weight of the organic soil, 1-6 parts by weight of the main emulsifier, 2-8 parts by weight of the auxiliary emulsifier, 3-18 parts by weight of the plugging agent, 5-30 parts by weight of the weighting agent, 2-6 parts by weight of the humectant, 2-7 parts by weight of the alkaline regulator and 2-10 parts by weight of the filtrate reducer are used, based on 100 parts by weight of base oil.

In some embodiments of the present disclosure, the inventors of the present disclosure have performed research in regard to the dosage of the respective components in the oil-based drilling fluid composition, in order to improve the plugging effect of the oil-based drilling fluid, the inventors have found that although the object of the present disclosure can be achieved to some extent by arranging that the oil-based drilling fluid composition comprise the base oil, the inhibitor, the organic soil, the main emulsifier, the auxiliary emulsifier, the plugging agent, the weighting agent, the humectant, the alkalinity adjuster and the filtrate reducer, and the ingredients are used in an amount within the above-mentioned ranges, it is preferable that 12-22 parts by weight of the inhibitor, 6-10 parts by weight of the organic soil, 2-5 parts by weight of the main emulsifier, 3-6 parts by weight of the auxiliary emulsifier, 4-16 parts by weight of the plugging agent, 10-25 parts by weight of the weighting agent, 3-5 parts by weight of the humectant, 3-6 parts by weight of the alkaline regulator and 3-6 parts by weight of the filtrate reducer are used, based on 100 parts by weight of base oil, the plugging agent is more uniformly and stably dispersed; after the oil-based drilling fluid is injected into the cracks, a solidified body formed by solidification at high temperature has higher strength and better toughness, and is particularly suitable for a leakage stratum with the joint development of the multi-scale cracks.

In some embodiments of the present disclosure, the plugging agent is preferably modified nanometer calcium carbonate, in order to further improve the plugging effect and the pressure-bearing capacity.

The modified nanometer calcium carbonate is prepared with the following process:

(a) subjecting nanometer calcium carbonate to an ultrasonic mixing, and heating to a temperature of 60-80° C., and adding phosphate, stearic acid, lauric acid and sodium dodecyl sulfate to perform an activation treatment to obtain a mixture;

(b) subjecting the mixture to a ball milling to obtain a slurry, and then drying the slurry to obtain modified nanometer calcium carbonate.

In some embodiments of the present disclosure, the weight ratio of nanometer calcium carbonate, phosphate, stearic acid, lauric acid and sodium dodecyl sulfate is 90-120: 1-6:1-6: 1-5:1-5; preferably, the weight ratio of nanometer calcium carbonate, phosphate, stearic acid, lauric acid and sodium dodecyl sulfate is 90-110: 3-5:3-5: 1-3:1-3.

In some embodiments of the present disclosure, the nanometer calcium carbonate is commercially available, for example, from Shanghai Macklin Biochemical Technologies Co., Ltd. The nanometer calcium carbonate is white powder with an average particle size of 50 nm.

In some embodiments of the present disclosure, the activation treatment in step (a) is performed under an ultrasonic mixing. The present disclosure does not particularly define the ultrasonic mixing equipment, for example, an ultrasonic wave magnetic stirrer may be used for performing the ultrasonic mixing. The conditions of the activation treatment comprise: the rotation speed is 200-300 rpm, the temperature is 120-150° C., and the time is 30-60 min. In the present disclosure, the activation time may be increased to improve activation degree of the modified nanometer calcium carbonate.

In some embodiments of the present disclosure, the conditions of ball milling in step (b) comprise: the rotation speed is 300-500 rpm, the ball milling time is 3-6 hours; the drying conditions comprise: the temperature is 90-100° C., and the time is 8-10 hours. In the present disclosure, the particle size range of the modified nanometer calcium carbonate can be small and kept at a nanometer level by performing ball milling and increasing the ball milling time.

In some embodiments of the present disclosure, the modified nanometer calcium carbonate has an average particle size within a range of 60-75 nm, preferably 65-70 nm. The particle size can be obtained through the scanning electron microscope test and the Fourier infrared spectroscopy test.

In some embodiments of the present disclosure, it is preferable that the average covering thickness of the stearic acid in the modified nanometer calcium carbonate is 10-25 nm, and the average covering thickness of the stearic acid can be obtained by subtracting the average particle size of the nanometer calcium carbonate from the average particle size of the modified nanometer calcium carbonate. It can be derived from the infrared characterization analysis that in the modified nanometer calcium carbonate, the firm chemical bonds are formed between the nanometer calcium carbonate and the stearic acid.

In some embodiments of the present disclosure, the modified nanometer calcium carbonate has desirable dispersibility in the oil-based drilling fluid.

In some embodiments of the present disclosure, the components of the oil-based drilling fluid composition may be stored in admixture or stored separately before use. Preferably, the components of the oil-based drilling fluid composition are stored separately before use.

In some embodiments of the present disclosure, the base oil may be provided from an oil phase conventionally employed in the art, such as white oil and/or diesel oil, preferably white oil. The white oil is mainly consisting of a mixture of saturated naphthenic hydrocarbon and paraffin hydrocarbon, it is obtained by subjecting the crude oil to normal pressure fractionation and reduced pressure fractionation, solvent extraction and dewaxing, and hydrofining. The white oil is commercially available, for example, from Shanghai Yuanye Bio-Technology Co., Ltd.

In some embodiments of the present disclosure, the inhibitor may be in general an aqueous solution of calcium chloride and/or an aqueous solution of potassium chloride, preferably a calcium chloride solution, more preferably a calcium chloride solution having a calcium chloride concentration of 15-25 wt %; calcium chloride is typically an ionic halide, which is white, hard lump or particle at room temperature. The calcium chloride solution is commercially available, for example, from Hebei Yanxi Chemical Co., Ltd.

In some embodiments of the present disclosure, the organic soil is preferably an oleophilic bentonite prepared by treating the sodium bentonite with an alkyl quaternary ammonium salt cationic surfactant, the organic soil is mainly composed of silicon dioxide, aluminum oxide and water, and further comprises iron, magnesium, calcium, sodium, potassium, and other elements. The alkyl quaternary ammonium salt is long-chain alkyl quaternary ammonium salt, the alkyl quaternary ammonium salt has preferably 12-30, more preferably 18-25, and most preferably 20-22 carbon atoms. In the aspect of well drilling, the organic soil can be used as a latex stabilizer; in the aspect of high temperature grease, the organic bentonite is specially used for the preparation of high temperature greases which are suitable for high temperature, long-term and continuous operation. The organic clay may be obtained commercially, for example from Xinyang Shenhui Bentonite Co., Ltd.

In some embodiments of the present disclosure, the primary function of the main emulsifier and the auxiliary emulsifier is to allow that the hydrophilic groups adsorb on the surface of solid-phase particles, and the lipophilic groups extend into the base fluid, a plurality of emulsifier molecules are orderly arranged on the solid-phase particles to form a membrane with a certain mechanical strength, such that the solid-phase particles are moderately dispersed in the base fluid.

In some embodiments of the present disclosure, the main emulsifier may be at least one of calcium naphthenate, oleic acid and naphthenic acid amide, wherein the calcium naphthenate has preferably 10-14 carbon atoms, and more preferably 11-13 carbon atoms; the naphthenic acid amide has preferably 12-18 carbon atoms, more preferably 14-16 carbon atoms. Preferably, the main emulsifier is oleic acid (i.e., cis-octadec-9-enoic acid); the oleic acid is commercially available, for example, from Nanjing Xinzhan New Material Co., Ltd. The performance parameters of the oleic acid comprise: the apparent viscosity is within a range of 20-120 mPa·s, preferably 40-60 mPa·s, the oleic acid can prevent the dispersed phase droplets from aggregation and enlargement, thereby stabilizing the emulsion.

In some embodiments of the present disclosure, the auxiliary emulsifier may be at least one of Span-80 and/or calcium alkyl benzene sulfonate, wherein the calcium alkyl benzene sulfonate has preferably 12-18, more preferably 14-16 carbon atoms. Preferably, the auxiliary emulsifier is Span-80; the Span-80 is commercially available, for example, from Guangdong Runhua Chemical Co., Ltd. The main component of the Span-80 is sorbitol monooleate.

In some embodiments of the present disclosure, the weighting agent is at least one of API barite, magnetite powder, ilmenite powder and manganese tetroxide, preferably API barite; barite powder, also called barium sulfate powder, has a chemical composition of $BaSO_4$, its crystal belongs to the sulfate minerals with an orthogonal (orthorhombic) crystal system, it is usually the crystal with a thick plate or columnar crystal shape, and is mostly a dense aggregate of the block-shaped or plate-shaped or granular crystals. It is colorless and transparent when the crystal is pure, and the crystal is dyed into various colors when it contains impurities, the striation is white with a glossiness of the glass, and it is transparent or semitransparent. The crystal has complete and medium cleavages along three directions, a Mohs hardness of 3-3.5 and specific gravity of 4.5. The addition of API weighting agent can improve the hydrostatic column pressure of the drilling fluid, play a role of balancing the collapse stress of the stratum and stabilizing the borehole wall, and can balance the fluid pressure of the stratum in a high-pressure well, thereby preventing an occurrence of accidents such as well kick and blowout. The API barite is commercially available, for example, from Wuxi Longcheng Trading Co., Ltd.

In some embodiments of the present disclosure, there is not particular limitation on the type or source of the humectant, it may be any humectant which is used for preparing the oil-based drilling fluids and known among those skilled in the art. For example, the humectant may be a commercially available fatty acid derivative, such as dodecyl trimethyl ammonium bromide, lecithin and dodecyl dimethyl benzyl ammonium chloride; preferably dodecyl trimethyl ammonium bromide. The dodecyl trimethyl ammonium bromide is commercially available, for example, from Chengdu Huachun Technology Co., Ltd.

In some embodiments of the present disclosure, the source of the alkaline regulator is not particularly limited, it is commercially available and well-known products for those skilled in the art. For example, the alkaline modifier may be calcium oxide and/or sodium carbonate, preferably calcium oxide.

In some embodiments of the present disclosure, the source of the filtrate reducer is not particularly limited, it may be the commercially available and well-known products for those skilled in the art. For example, the filtrate reducer may be at least one of sodium carboxymethyl cellulose, humic acid and lignite lye, and preferably sodium carboxymethyl cellulose. The sodium carboxymethyl cellulose is commercially available, for example, from Shanghai Nature Scientific Biological Technology Co., Ltd.

In some specific embodiments of the present disclosure, the modified nanometer calcium carbonate contained in the oil-based drilling fluid composition can be desirably dispersed into the drilling fluid, and can plug the micro-cracks with a low concentration, so that an invasion of the drilling fluid can be prevented, the permeability of a shale stratum can be reduced, the propagation of pore pressure is delayed, and the bearing capacity of the stratum is enhanced; the oil-based drilling fluid composition adopts components with specific content, the components have desirable interaction, the prepared oil-based drilling fluid excellent rheological property, and can improve purification capability of the borehole; the drilling fluid has high plugging rate and strong adaptability, can significantly improve stability of the borehole and capability of filter loss control, facilitate the high-quality, rapid, safe and efficient drilling operation.

In a second aspect, the present disclosure provides an oil-based drilling fluid prepared by mixing the aforementioned oil-based drilling fluid composition; the oil-based drilling fluid has a permeability reduction rate not less than 72.8%, and preferably within a range of 72.8-76.78%.

In a third aspect of the present disclosure provides a method of preparing an oil-based drilling fluid, the method comprises the following steps:

mixing the base fluid with a main emulsifier, an auxiliary emulsifier, a filtrate reducer, a humectant, an alkaline regulator, organic soil, a plugging agent and a weighting agent in sequence to prepare the oil-based drilling fluid;

wherein the base fluid comprises a base oil and an inhibitor;

5-25 parts by weight of the inhibitor, 5-12 parts by weight of the organic soil, 1-6 parts by weight of the main emulsifier, 2-8 parts by weight of the auxiliary emulsifier, 3-18 parts by weight of the plugging agent, 5-30 parts by weight of the weighting agent, 2-6 parts by weight of the humectant, 2-7 parts by weight of the alkaline regulator and 2-10 parts by weight of the filtrate reducer are used, based on 100 parts by weight of base oil.

In some embodiments of the present disclosure, in order to further improve the plugging effect and the pressure bearing capacity, the plugging agent is preferably modified nanometer calcium carbonate. The modified nanometer calcium carbonate can be prepared according to the aforementioned method, which will not be repeated here.

In some embodiments of the present disclosure, the types and used amounts of the base oil, the inhibitor, the main emulsifier, the auxiliary emulsifier, the filtrate reducer, the humectant, the alkalinity regulator and the organic soil can be selected according to the above description, the content will not be repeatedly described herein.

In some embodiments of the present disclosure, the mode of mixing in step (1) is preferably the high-speed stirring; the present disclosure does not impose specific limitation on the high-speed stirring container, it may be a dedicated cup for storing liquid for the drilling fluid variable frequency double-shaft high-speed stirrer. The rotation speed of the high-speed stirring may be within a range of 1,000-5,000 rpm, and preferably 1,000-4,000 rpm; the temperature of the high-speed stirring is preferably room temperature, the present disclosure does not impose a specific limitation thereto.

In a preferred embodiment of the present disclosure, the mixing process specifically comprises:

stirring the base oil and the inhibitor for 5-10 minutes, adding the main emulsifier and stirring for 5-10 minutes, adding the auxiliary emulsifier and stirring for 5-10 minutes, then adding the filtrate reducer and stirring for 5-10 minutes, adding the humectant and stirring for 10-20 minutes, subsequently adding the alkaline regulator and stirring for 10-20 minutes, adding the organic soil and stirring for 20-30 minutes, and finally adding the plugging agent and the weighting agent and stirring for 20-30 minutes.

The oil-based drilling fluid provided by the present disclosure has a simple preparation method, mild operational condition, and easiness to operate, and the adopted raw materials are green and environment-friendly, so that the oil-based drilling fluid has a wide application prospect.

In a fourth aspect, the present disclosure provides an oil-based drilling fluid prepared with the aforementioned method. The oil-base drilling fluid has a permeability reduction rate not less than 72.8%, preferably within a range of 72.8-76.78%.

In a fifth aspect, the present disclosure provides an application of the aforementioned oil-based drilling fluid composition or the aforementioned oil-based drilling fluid for leakage prevention and plugging in the well drilling operation.

The present disclosure will be described in detail below with reference to examples.

In the following examples and comparative examples, unless otherwise specified, all of the feeding materials are commercially available products, wherein:

the nanometer calcium carbonate was purchased from Shanghai Macklin Biochemical Technologies Co., Ltd., with an average particle size of 50 nm;

the white oil was purchased from Shanghai Yuanye Bio-Technology Co., Ltd.;

the calcium chloride solution was purchased from Hebei Yanxi Chemical Co., Ltd.;

the organic soil was purchased from Xinyang Shenhui Bentonite Co., Ltd.;

the oleic acid (i.e., cis-octadec-9-enoic acid) was purchased from Nanjing Xinzhan New Material Co., Ltd., with an apparent viscosity of 40 mPa·s;

the oleic acid was purchased from Nanjing Xinzhan New Material Co., Ltd., with an apparent viscosity of 10 mPa·s;

Span-80 was purchased from Guangdong Runhua Chemical Co., Ltd.;

API barite was purchased from Wuxi Longcheng Trading Co., Ltd.;

the dodecyl trimethyl ammonium bromide was purchased from Chengdu Huachun Technology Co., Ltd.;

the sodium carboxymethyl cellulose was purchased from Shanghai Nature Scientific Biological Technology Co., Ltd.;

the unidirectional pressure plugging agent was purchased from Xingtang County Xinlei Mineral Powder Processing Factory in Hebei Province, the plugging agent had an average particle size of 150 nm, a density of 1.5 g/cm$^3$, a blocking filter loss less than 35 mL, and a content of water-soluble substance less than 5%.

The test methods involved in the following examples and comparative examples were as follows:

the scanning electron microscope test was performed by using a scanning electron microscope with a model XL-30 purchased from the FEI company in the United States of America (USA);

the Fourier infrared spectroscopy test was performed by using the Fourier transform infrared spectrometer with a model FTIR-1500 purchased from Josvok Technology (Tianjin) Co., Ltd.;

the degree of activation was measured according to the National Standard "GBT 19281-2003 Calcium Carbonate Analysis Method";

through the preparation of a "simulated core" of the oil-based drilling fluid, namely the formation of a mud cake and the test of the permeability thereof, the prepared mud cake was a "simulated core" of an ultralow-permeability stratum with nanometer-micron pores and cracks, the permeability of the simulated core was $10^{-4}$ mD, and the plugging effect evaluation was subsequently carried out.

The evaluation process comprises the following steps:
1. Preparation of the base slurry:

base slurry a: 100 parts by weight of white oil, 5 parts by weight of calcium chloride solution, 5 parts by weight of organic soil, 1 part by weight of oleic acid, 2 parts by weight of Span-80, 5 parts by weight of API barite, 2 parts by weight of sodium carboxymethyl cellulose, 2 parts by weight of calcium oxide and 2 parts by weight of dodecyl trimethyl ammonium bromide were stirred at a high speed and uniformly dispersed;

base slurry b: 100 parts by weight of white oil, 25 parts by weight of calcium chloride solution, 12 parts by weight of organic soil, 6 parts by weight of oleic acid, 8 parts by weight of Span-80, 30 parts by weight of API barite, 6 parts by weight of sodium carboxymethyl cellulose, 7 parts by weight of calcium oxide and 10 parts by weight of dodecyl trimethyl ammonium bromide were stirred at a high speed and uniformly dispersed;

base slurry c: 100 parts by weight of white oil, 12 parts by weight of calcium chloride solution, 6 parts by weight of organic soil, 2 parts by weight of oleic acid, 3 parts by weight of Span-80, 10 parts by weight of API barite, 3 parts by weight of sodium carboxymethyl cellulose, 3 parts by weight of calcium oxide and 3 parts by weight of dodecyl trimethyl ammonium bromide were stirred at a high speed and uniformly dispersed;

base slurry d: 100 parts by weight of white oil, 22 parts by weight of calcium chloride solution, 10 parts by weight of organic soil, 5 parts by weight of oleic acid, 6 parts by weight of Span-80, 25 parts by weight of API barite, 5 parts by weight of sodium carboxymethyl cellulose, 6 parts by weight of calcium oxide and 6 parts by weight of dodecyl trimethyl ammonium bromide were stirred at a high speed and uniformly dispersed.

2. Preparation of a "simulated core": the prepared base slurry was put into a high-temperature high-pressure filter press to measure its filtrate loss, the temperature was set to be 105° C., the initial filtrate loss was measured when the temperature was raised to a target temperature, the pressure difference was adjusted to be 3.5 MPa, the final filtrate loss was measured after waiting for 40-60 min, the base slurry in the instrument was poured out, white oil was injected into the instrument along the inner wall for 1-2 times, the white oil was poured out after gently shaking it, the vacuous mud cakes were removed as much as possible, the white oil was subsequently injected to a height mark of scale, the filtrate loss of the mud cake under the condition of the white oil at 105° C. and 3.5 MPa was measured, the reading was recorded once for every 5 min, and the test was finished after 30 min; the white oil was cooled to room temperature, the cooled white oil was poured out, the mud cakes in the instrument was taken out, vacuous mud cakes on the mud cakes were washed off by using the white oil, the formed mud cakes were subjected to standing still for 10 minutes, the thickness of the mud cakes was measured, the average value of the thickness of the mud cakes was regarded as the thickness of the mud cakes, and the permeability K of the mud cakes was calculated by adopting the following formula:

$$K = q \cdot l \cdot \mu / (A \cdot \Delta p)$$

wherein K denoted the mud cake permeability with the unit Darcy (D); q denoted the flow rate of the fluid passing through the rock core in an unit time, the unit was $cm^3/s$; l denoted the core length in the unit of cm; $\mu$ denoted viscosity of the fluid passing through the core, the unit was Pa·s; A denoted the cross-sectional area of the core perpendicular to the flow direction, the unit was $cm^2$; $\Delta P$ denoted the differential pressure of the fluid before and after passing through the core, the unit was MPa.

3. Aging test: the base slurry was put into an aging tank, the temperature was set at 105° C., the base slurry was subjected to aging for 4 hours, the permeability thereof was measured. The result showed that the permeability of the mud cake formed by the aged oil-based drilling fluid was lower than the permeability before the aging process, that is, the quality of the mud cake was optimized through an aging experiment.

4. Evaluation of the plugging effect: 2.5 wt % of graphene was put into white oil and stirred at the rotation speed of 11,000 rpm for 30 min. The aged base slurry was taken out, and cooled to room temperature, the base slurry was then poured into a high-temperature high-pressure filter press, the filtrate loss of the base slurry was measured under the conditions of 105° C./3.5 MPa/30 min, the base slurry was cooled to room temperature and then poured out from the instrument, white oil was injected into the instrument along the inner wall for 1-2 times, the white oil was poured out after gently shaking it, the vacuous mud cakes were removed as much as possible, the white oil was subsequently injected to a height mark of scale, the filtrate loss of the mud cake under the condition of the white oil at 105° C. and 3.5 MPa was measured once for every 5 min, and the test was finished after 30 min, the permeability of the base slurry mud cakes was obtained;

replaced the base slurry with an oil-based drilling fluid containing a plugging agent, and repeated the above process, the mud cake permeability of the plugging agent slurry was obtained;

the permeability reduction rate Kr was calculated with the following formula, so that the plugging effect can be evaluated, the higher was the permeability reduction rate, the better was the plugging effect:

$$K_r = \frac{K_0 - K'}{K_0} \times 100\%$$

wherein Kr denoted the permeability reduction rate in an unit of %; $K_0$ denoted the permeability of the base slurry mud cake with the unit Darcy (D); K' denoted the mud cake permeability of the plugging agent slurry, the unit was Darcy (D).

Preparation examples 1 to 3 served to illustrate the modified nanometer calcium carbonate contained in the blocking agent composition of the present disclosure and the method of preparing the modified nanometer calcium carbonate.

Preparation Example 1

(a) 100 parts by weight of nanometer calcium carbonate was added into an ultrasonic wave stirrer, and subjected to heating and blending, after the temperature reached 60° C., 4 parts by weight of phosphate, 4 parts by weight of stearic acid, 3 parts by weight of lauric acid and 3 parts by weight of sodium dodecyl sulfate were poured into an ultrasonic wave magnetic stirrer and subjected to mixing, the mixing temperature was controlled to be 130° C., and the activation treatment was performed for 40 min to obtain a mixture;

(b) the mixture was subjected to ball milling at the rotation speed of 400 rpm for 4 hours to obtain a slurry, the slurry was then placed in an oven, and subjected to drying at the temperature of 100° C. for 10 hours to prepare the modified nanometer calcium carbonate denoted as Z1.

The results of the scanning electron microscope test and the Fourier infrared spectroscopy test indicated that the average particle size of the modified nanometer calcium carbonate Z1 was 70 nm.

Preparation Example 2

(a) 100 parts by weight of nanometer calcium carbonate was added into an ultrasonic wave stirrer, and subjected to heating and blending, after the temperature reached 70° C., 4 parts by weight of phosphate, 4 parts by weight of stearic acid, 3 parts by weight of lauric acid and 3 parts by weight of sodium dodecyl sulfate were poured into an ultrasonic wave magnetic stirrer and subjected to mixing, the mixing temperature was controlled to be 130° C., and the activation treatment was performed for 50 min to obtain a mixture;

(b) the mixture was subjected to ball milling at the rotation speed of 400 rpm for 4 hours to obtain a slurry, the slurry was then placed in an oven, and subjected to drying at the temperature of 100° C. for 10 hours to prepare the modified nanometer calcium carbonate denoted as Z2.

The results of the scanning electron microscope test and the Fourier infrared spectroscopy test indicated that the average particle size of the modified nanometer calcium carbonate Z2 was 65 nm.

Preparation Example 3

(a) 100 parts by weight of nanometer calcium carbonate was added into an ultrasonic wave stirrer, and subjected to heating and blending, after the temperature reached 80° C., 4 parts by weight of phosphate, 4 parts by weight of stearic acid, 3 parts by weight of lauric acid and 3 parts by weight of sodium dodecyl sulfate were poured into an ultrasonic wave magnetic stirrer and subjected to mixing, the mixing temperature was controlled to be 130° C., and the activation treatment was performed for 60 min to obtain a mixture;

(b) the mixture was subjected to ball milling at the rotation speed of 400 rpm for 4 hours to obtain a slurry, the slurry was then placed in an oven, and subjected to drying at the temperature of 100° C. for 10 hours to prepare the modified nanometer calcium carbonate which was denoted as Z3.

The results of the scanning electron microscope test and the Fourier infrared spectroscopy test indicated that the average particle size of the modified nanometer calcium carbonate Z3 was 60 nm.

Comparative Preparation Example 1

The modified nanometer calcium carbonate was prepared according to the same method as in the preparation example 1, except that 4 parts by weight of stearic acid was replaced with 4 parts by weight of sodium stearate, the prepared the modified nanometer calcium carbonate was denoted as DZ1.

The dispersion of modified nanometer calcium carbonate DZ1 was poor relative to the dispersion of modified nanometer calcium carbonate Z1.

Comparative Preparation Example 2

The modified nanometer calcium carbonate was prepared according to the same method as in the preparation example 1, except that in step (a), 100 parts by weight of nanometer calcium carbonate was poured into an ultrasonic mixer, and subjected to heating and blending, after the temperature reached 100° C., 4 parts by weight of phosphate, 4 parts by weight of stearic acid, 3 parts by weight of lauric acid and 3 parts by weight of sodium dodecyl sulfate were poured into the ultrasonic wave stirrer and subjected to mixing, the mixing temperature was controlled to be 130° C., and the activation treatment was performed for 10 min to obtain a mixture; the prepared modified nanometer calcium carbonate was denoted as DZ2.

The modified nanometer calcium carbonate DZ2 was measured with a low degree of activation.

Comparative Preparation Example 3

The modified nanometer calcium carbonate was prepared according to the same method as in the preparation example 1, except that the mixture in step (b) was not subjected to ball milling, the prepared modified nanometer calcium carbonate was denoted as DZ3.

The measurement result obtained with a laser particle size analyzer that the particle size range of the modified nanometer calcium carbonate DZ3 obtained without performing ball milling was larger than that of the modified nanometer calcium carbonate Z1.

Examples 1-12 served to illustrate the oil-based drilling fluids of the present disclosure and methods of preparing the oil-based drilling fluids.

Example 1

100 parts by weight of white oil and 5 parts by weight of calcium chloride solution were blended and stirred at the stirring speed of 1,000 rpm for 10 minutes, 1 part by weight of oleic acid was then added and stirred at the stirring speed of 2,000 rpm for 10 minutes, 2 parts by weight of Span-80 was added and stirred at the stirring speed of 2,000 rpm for 10 minutes, 2 parts by weight of sodium carboxymethyl cellulose was added and stirred at the stirring speed of 2,000 rpm for 10 minutes, 2 parts by weight of dodecyl trimethyl ammonium bromide was added and stirred at the stirring speed of 2,000 rpm for 20 minutes, 2 parts by weight of calcium oxide was added and stirred at the stirring speed of 2,000 rpm for 20 minutes, 5 parts by weight of organic soil was further added and stirred at the stirring speed of 3,000 rpm for 30 minutes, 3 parts by weight of modified nanometer calcium carbonate Z1 and 5 parts by weight of API barite were added and stirred at the high speed of 4,000 rpm for 30 minutes, the prepared oil-based drilling fluid was denoted as S1. Wherein the apparent viscosity of oleic acid was 40 mPa·s.

Example 2

The oil-based drilling fluids S2-S12 were prepared according to the same method as in Example 1, except that the types and used amounts of the raw materials in the oil-based drilling fluid compositions are different, as specified in Table 1.

Table 1 Types and used amounts of raw materials in the oil-based drilling fluid compositions in the Examples

TABLE 1

Types and used amounts of raw materials in the oil-based drilling fluid compositions in the Examples

| Ingredients Parts by weight | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Z1 | 3 | — | — | 3 | — | — | 3 | — | — | 3 | — | — |
| Z2 | — | 3 | — | — | 3 | — | — | 3 | — | — | 3 | — |
| Z3 | — | — | 3 | — | — | 3 | — | — | 3 | — | — | 3 |
| White oil | 100 | 100 | 100 | 100 | 100 | 100 | 100 | 100 | 100 | 100 | 100 | 100 |
| Calcium chloride solution | 5 | 5 | 5 | 25 | 25 | 25 | 12 | 12 | 12 | 22 | 22 | 22 |
| Organic soil | 5 | 5 | 5 | 12 | 12 | 12 | 6 | 6 | 6 | 10 | 10 | 10 |
| Oleic acid | 1 | 1 | 1 | 6 | 6 | 6 | 2 | 2 | 2 | 5 | 5 | 5 |
| Span-80 | 2 | 2 | 2 | 8 | 8 | 8 | 3 | 3 | 3 | 6 | 6 | 6 |
| API barite | 5 | 5 | 5 | 30 | 30 | 30 | 10 | 10 | 10 | 25 | 25 | 25 |
| Sodium carboxymethyl cellulose | 2 | 2 | 2 | 6 | 6 | 6 | 3 | 3 | 3 | 5 | 5 | 5 |
| Calcium oxide | 2 | 2 | 2 | 7 | 7 | 7 | 3 | 3 | 3 | 6 | 6 | 6 |
| Dodecyl trimethyl ammonium bromide | 2 | 2 | 2 | 10 | 10 | 10 | 3 | 3 | 3 | 6 | 6 | 6 |

Comparative Example 1

The oil-based drilling fluid was prepared according to the same method as in Example 1, except that the oil-based drilling fluid composition did not comprise the modified nanometer calcium carbonate Z1, the prepared oil-based drilling fluid was denoted as D1.

Comparative Example 2

The oil-based drilling fluid was prepared according to the same method as in Example 1, except that 3 parts by weight of unmodified nanometer calcium carbonate was added, the prepared oil-based drilling fluid was denoted as D2.

Comparative Example 3

The oil-based drilling fluid was prepared according to the same method as in Example 2, except that 3 parts by weight of unmodified nanometer calcium carbonate was added, the prepared oil-based drilling fluid was denoted as D3.

Comparative Example 4

The oil-based drilling fluid was prepared according to the same method as in Example 3, except that 3 parts by weight of unmodified nanometer calcium carbonate was added, the prepared oil-based drilling fluid was denoted as D4.

Comparative Example 5

The oil-based drilling fluid was prepared according to the same method as in Example 1, except that the modified nanometer calcium carbonate Z1 was replaced with a mixture of nanometer calcium carbonate, phosphate, stearic acid, lauric acid and sodium dodecyl sulfate, wherein the weight ratio of nanometer calcium carbonate, phosphate, stearic acid, lauric acid and sodium dodecyl sulfate was 100:4:4:3:3, the prepared oil-based drilling fluid was denoted as D5.

Comparative Example 6

The oil-based drilling fluid was prepared according to the same method as in Example 1, except that 3 parts by weight of the unidirectional pressure plugging agent was added, the prepared oil-based drilling fluid was denoted as D6.

Comparative Example 7

The oil-based drilling fluid was prepared according to the same method as in Example 1, except that 19 parts by weight of the modified nanometer calcium carbonate was added, the prepared oil-based drilling fluid was denoted as D7.

Comparative Example 8

The oil-based drilling fluid was prepared according to the same method as in Example 1, except that the modified nanometer calcium carbonate Z1 was replaced with the modified nanometer calcium carbonate DZ1, the prepared oil-based drilling fluid was denoted as D8.

Comparative Example 9

The oil-based drilling fluid was prepared according to the same method as in Example 1, except that the modified nanometer calcium carbonate Z1 was replaced with the modified nanometer calcium carbonate DZ2, the prepared oil-based drilling fluid was denoted as D9.

Comparative Example 10

The oil-based drilling fluid was prepared according to the same method as in Example 1, except that the modified nanometer calcium carbonate Z1 was replaced with the modified nanometer calcium carbonate DZ3, the prepared oil-based drilling fluid was denoted as D10.

Comparative Example 11

The oil-based drilling fluid was prepared according to the same method as in Example 1, except that the apparent viscosity of oleic acid was 10 mPa·s, the prepared oil-based drilling fluid was denoted as D11.

The oil-based drilling fluids of the Examples and Comparative examples were subjected to plugging performance tests, and the results were shown in Table 2.

TABLE 2

| Drilling fluids | High-temperature and high pressure filtrate loss mL | Permeability $K_0$ of the infiltration medium $10^{-4}$ md | Permeability $K_r$ of the drilling fluid $10^{-4}$ md | Permeability reduction rate % |
|---|---|---|---|---|
| S1  | 8.7  | 4.78 | 1.24 | 74.05 |
| S2  | 8.9  | 4.78 | 1.26 | 73.64 |
| S3  | 9.2  | 4.78 | 1.28 | 73.22 |
| S4  | 8.6  | 4.78 | 1.30 | 72.80 |
| S5  | 8.3  | 4.78 | 1.14 | 76.15 |
| S6  | 8.9  | 4.78 | 1.24 | 74.05 |
| S7  | 8.8  | 4.78 | 1.22 | 74.47 |
| S8  | 8.4  | 4.78 | 1.18 | 75.31 |
| S9  | 8.6  | 4.78 | 1.24 | 74.05 |
| S10 | 7.8  | 4.78 | 1.26 | 73.64 |
| S11 | 8.8  | 4.78 | 1.28 | 73.22 |
| S12 | 8.4  | 4.78 | 1.34 | 76.78 |
| D1  | 18.2 | 4.78 | 3.24 | 32.21 |
| D2  | 14.4 | 4.78 | 2.98 | 37.65 |
| D3  | 13.8 | 4.78 | 2.88 | 39.75 |
| D4  | 14.2 | 4.78 | 3.00 | 37.24 |
| D5  | 14.1 | 4.78 | 2.98 | 37.65 |
| D6  | 15.8 | 4.78 | 3.14 | 34.30 |
| D7  | 11.4 | 4.78 | 2.24 | 53.14 |
| D8  | 13.2 | 4.78 | 2.85 | 40.38 |
| D9  | 13.8 | 4.78 | 2.91 | 39.12 |
| D10 | 14.3 | 4.78 | 2.99 | 37.45 |
| D11 | 13.4 | 4.78 | 3.02 | 36.82 |

The results in Table 2 demonstrate that the oil-based drilling fluid disclosed by the present disclosure comprises the modified nanometer calcium carbonate which is lipophilic and has strong pressure bearing capacity, thus the oil-based drilling fluid has desirable plugging capacity; due to the surface modification of the calcium carbonate, the modified calcium carbonate can be dispersed in the oil-based drilling fluid in a nano-scale, and can plug the pore throats and cracks in the nano-scale, so that the oil-based drilling fluid produces excellent plugging effects with low permeability and high plugging rate.

In Examples 1-12, the high-temperature and high-pressure filtrate loss of the drilling fluids is within a range of 7.8-9.2 mL, it indicates that the modified nanometer calcium carbonate contained in the oil-based drilling fluids of the present disclosure can effectively prevent leakage and loss of a large amount of drilling fluid filtrate. In addition, the permeability reduction rate of the drilling fluid is not lower than 72.8%, which illustrates that the oil-based drilling fluids of the present disclosure can effectively plug the micrometer and nano-scale pores in the stratum, and the oil-based drilling fluids are conducive to the safe and efficient drilling operation.

In Comparative example 1, the oil-based drilling fluid composition does not comprise the modified nanometer calcium carbonate, the high-temperature and high-pressure filtrate loss of the prepared oil-based drilling fluid is more than 15 mL, and the permeability reduction rate is less than 40%, it indicates that the drilling fluid prepared in Comparative example 1 has large filtrate loss, a high permeability in mud cakes, the drilling fluid basically has no plugging effect.

In Comparative Examples 2-4, the oil-based drilling fluids composition comprise the unmodified nanometer calcium carbonate, the prepared oil-based drilling fluids have a filtrate loss within a range of 13-15 mL, the permeability in mud cakes are high, and the plugging effects are not obvious.

In Comparative example 5, the modified nanometer calcium carbonate in the oil-based drilling fluid composition is replaced by the raw materials available for preparing the modified nanometer calcium carbonate in the present disclosure, the plugging effect of the prepared oil-based drilling fluid is similar to that of the drilling fluids of Comparative examples 2-4, it demonstrates that the modified nanometer calcium carbonate, instead of the nanometer calcium carbonate, has the desirable plugging effects.

In Comparative example 6, the oil-based drilling fluid composition uses a commercially available plugging agent, which can reduce permeability and provide the plugging effects in a certain degree, but the plugging effects are obviously inferior to the plugging effects of the oil-based drilling fluid of the present disclosure.

In Comparative example 7, the used amount of the plugging agent in the oil-based drilling fluid composition does not fall into the range defined by the present disclosure, the prepared oil-based drilling fluid produces plugging effects, but the plugging effects are poor.

In Comparative examples 8-10, the raw materials outside the ranges defined by the present disclosure or the preparation conditions outside the ranges defined by the present disclosure are used in the preparation process of the modified nanometer calcium carbonate, the prepared modified nanometer calcium carbonate has poor dispersibility, low activation degree, and larger particle size range, thus the plugging effects of the oil-based drilling fluid cannot be improved.

In Comparative example 11, the oil-based drilling fluid composition uses component materials having a technical indicator going beyond the range defined by the present disclosure, the prepared oil-based drilling fluid has unsatisfactory plugging effects.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. An oil-based drilling fluid composition comprising a base fluid and a treating agent, wherein the base fluid comprises a base oil and an inhibitor; the treating agent comprises an organic soil, a main emulsifier, an auxiliary emulsifier, a plugging agent, a weighting agent, a humectant, an alkaline regulator and a filtrate reducer;
   wherein 5-25 parts by weight of the inhibitor, 5-12 parts by weight of the organic soil, 1-6 parts by weight of the main emulsifier, 2-8 parts by weight of the auxiliary emulsifier, 3-18 parts by weight of the plugging agent, 5-30 parts by weight of the weighting agent, 2-6 parts by weight of the humectant, 2-7 parts by weight of the alkaline regulator and 2-10 parts by weight of the filtrate reducer are used, based on 100 parts by weight of base oil;
   wherein the plugging agent is a modified nanometer calcium carbonate; the modified nanometer calcium carbonate is prepared with the following process:
   (a) subjecting nanometer calcium carbonate to an ultrasonic mixing, and heating to a temperature of 60-80° C., and adding phosphate, stearic acid, lauric acid and sodium dodecyl sulfate to perform an activation treatment to obtain a mixture; and (b) subjecting the mixture to a ball milling to obtain a slurry, and then drying the slurry to obtain modified nanometer calcium carbonate.

2. The oil-based drilling fluid composition of claim 1, wherein the weight ratio of nanometer calcium carbonate, phosphate, stearic acid, lauric acid and sodium dodecyl sulfate is 90-120: 1-6:1-6: 1-5:1-5.

3. The oil-based drilling fluid composition of claim 1, wherein the weight ratio of nanometer calcium carbonate, phosphate, stearic acid, lauric acid and sodium dodecyl sulfate is 90-110: 3-5:3-5: 1-3:1-3.

4. The oil-based drilling fluid composition of claim 1, wherein the conditions of the mixing and activation treatment in step (a) comprise: the rotation speed is 200-300 rpm, the temperature is 60-80° C., and the time is 30-60 min.

5. The oil-based drilling fluid composition of claim 1, wherein the conditions of ball milling in step (b) comprise: the rotation speed is 300-500 rpm, the ball milling time is 3-6 hours; the drying conditions comprise: the temperature is 90-100° C., and the time is 8-10 hours.

6. The oil-based drilling fluid composition of claim 1, wherein the modified nanometer calcium carbonate has an average particle size within a range of 60-75 nm.

7. The oil-based drilling fluid composition of claim 1, wherein the modified nanometer calcium carbonate has an average particle size within a range of 65-70 nm.

8. The oil-based drilling fluid composition of claim 1, wherein the average covering thickness of the stearic acid in the modified nanometer calcium carbonate is 10-25 nm.

9. The oil-based drilling fluid composition of claim 1, wherein 12-22 parts by weight of the inhibitor, 6-10 parts by weight of the organic soil, 2-5 parts by weight of the main emulsifier, 3-6 parts by weight of the auxiliary emulsifier, 4-16 parts by weight of the plugging agent, 10-25 parts by weight of the weighting agent, 3-5 parts by weight of the humectant, 3-6 parts by weight of the alkaline regulator and 3-6 parts by weight of the filtrate reducer are used, based on 100 parts by weight of base oil.

10. The oil-based drilling fluid composition of claim 1, wherein the base oil is white oil and/or diesel oil;
the inhibitor is a calcium chloride solution and/or a potassium chloride solution;
the main emulsifier is at least one of calcium naphthenate, oleic acid or naphthenic acid amide;
the weighting agent is at least one of API barite, magnetite powder, ilmenite powder or manganese tetroxide;
the humectant is at least one of dodecyl trimethyl ammonium bromide, lecithin or dodecyl dimethyl benzyl ammonium chloride;
the alkaline regulator is calcium oxide and/or sodium carbonate; and
the filtrate reducer is at least one of sodium carboxymethyl cellulose, humic acid or lignite lye.

11. The oil-based drilling fluid composition of claim 10, wherein the based oil is white oil;
the inhibitor is a calcium chloride solution;
the main emulsifier is oleic acid;
the weighting agent is API barite;
the humectant is dodecyl trimethyl ammonium bromide;
the alkaline regulator is calcium oxide; and
the filtrate reducer is sodium carboxymethyl cellulose.

12. The oil-based drilling fluid composition of claim 11, wherein the oleic acid has an apparent viscosity within a range of 20-120 mPa·s.

13. The oil-based drilling fluid composition of claim 11, wherein the oleic acid has an apparent viscosity within a range of 40-60 mPa·s.

14. An oil-based drilling fluid prepared by mixing the oil-based drilling fluid composition of claim 1;
the oil-based drilling fluid has a permeability reduction rate not less than 72.8%.

15. The oil-based drilling fluid of claim 14, wherein the oil-based drilling fluid has a permeability reduction rate within a range of 72.8-76.78%.

\* \* \* \* \*